US005656379A

United States Patent [19]

Koide et al.

[11] Patent Number: 5,656,379

[45] Date of Patent: Aug. 12, 1997

[54] PAPER FOR FORMING IMAGES AND IMAGE FORMING PROCESS

[75] Inventors: Jun Koide, Tokyo; Tatsuo Takeuchi, Kawasaki, both of Japan

[73] Assignee: Canon Kabushiki Kaisha, Tokyo, Japan

[21] Appl. No.: 397,884

[22] Filed: Mar. 2, 1995

[30] Foreign Application Priority Data

Mar. 10, 1994 [JP] Japan .................................. 6-039857

[51] Int. Cl.[6] .................................................. B32B 29/00

[52] U.S. Cl. ...................... 428/537.5; 428/195; 428/211; 428/342; 428/690

[58] Field of Search .................................. 428/211, 47.1, 428/195, 342, 537.5, 690; 162/70

[56] References Cited

U.S. PATENT DOCUMENTS 4,422,854 12/1983 Hahnle et al. .............................. 8/471
4,559,273 12/1985 Kutsukake et al. ..................... 428/484
4,812,439 3/1989 Ohara et al. ............................ 503/227

OTHER PUBLICATIONS

"Measurement of Paper Whiteness," Printing Magazine, vol. 71, No. 7, pp. 31–40 (1988).

*Primary Examiner*—William Krynski
*Attorney, Agent, or Firm*—Fitzpatrick, Cella, Harper & Scinto

[57] ABSTRACT

An image forming paper comprises at least pulp, wherein the paper has a spectral reflectance of at least 85% for light diffused-reflected therefrom in a wavelength range of from 440 nm to 640 nm, and a spectral reflectance distribution in which the difference between the maximum and minimum values of the spectral reflectance of the light in the above wavelength range is 5% or less. Therefore, since the amount of light reflected by the paper is large and the reflectance in blue to red regions is constant, color chroma of a color image on the paper is enhanced particularly in green to red regions, and a color reproduction area of the color image is enlarged.

14 Claims, 11 Drawing Sheets

PAPER FOR FORMING IMAGES AND IMAGE FORMING PROCESS

BACKGROUND OF THE INVENTION

1. Field of the Invention

The present invention relates to an image forming paper for forming a color image, particularly, a full-color image thereon by an image forming apparatus using a plurality of color toners, such as an electrophotographic apparatus and an ink-jet printer, and an image forming process using the image forming paper.

2. Description of the Related Art

Conventional image forming paper has been manufactured in pursuit of visual whiteness as mentioned in "Measurement of Paper Whiteness", *Printing Magazine*, Vol. 71, No.7 (1988), pp. 31–40. Since a paper is visually regarded as whiter as its reflectance for a blue component of light having a wavelength range of from 430 nm to 570 nm is higher, developments have been made to increase the reflectance for the blue component.

Since a reflectance of paper for light having a wavelength of 457 nm is defined as a value of whiteness, it is considered that the increase of the reflectance for the blue component leads to higher whiteness.

The whiteness as the reflectance for light having a wavelength of 457 nm is increased by bleaching paper to remove color development by impure colored substances, adding a large amount of blue dye to increase the reflectance for blue, and adding a small amount of blue fluorescent dye to further increase the reflectance for blue.

However, since a large amount of blue dye is added in the above-mentioned related art, the reflectance is decreased in regions from green to red (wavelength range of from 500 nm to 700 nm) as shown in FIG. 4. Although the addition of blue dye increases the whiteness of paper, it lowers color reproducibility of a color toner image formed on the paper in green to red regions, and, in particular, lowers color chroma. Color appears because a component having a specific wavelength of light radiated from an outside source is absorbed in passing through color toner laid on paper and components of the light having other wavelengths are reflected by the paper, passed again through the color toner and diffused outside the paper. Therefore, low reflectance of paper for the green to red regions means that the amount of light diffused out of toner, which transmits the wavelength components of such color (green to red), decreases, that is, the color is subdued. In other words, the chroma of color having wavelength components from green to red decreases.

SUMMARY OF THE INVENTION

An object of the present invention is to provide an image forming paper for solving the above problems, and an image forming process using the image forming paper.

Another object of the present invention is to provide an image forming paper capable of obtaining a color image having small variations in spectral reflectance of light diffused-reflected from the paper in a wavelength range of from 440 nm to 640 nm, having blue and green-red components, and high color chroma, and an image forming process using the image forming paper.

Still another object of the present invention is to provide an image forming paper having high spectral reflectance for blue and high whiteness, and causing little decrease of the spectral reflectance in green to red regions, and an image forming process using the image forming paper.

A further object of the present invention is to provide a paper for forming images comprising at least pulp; said paper having a spectral reflectance of at least 85% for light diffused-reflected from said paper in a wavelength range of from 440 nm to 640 nm, and a spectral reflectance distribution in which the difference between the maximum and minimum values of the spectral reflectance in said wavelength range is 5% or less.

A still further object of the present invention is to provide an image forming process comprising the step of;

forming a color image with color toner on an image forming paper, wherein the image forming paper comprises at least pulp, said paper having a spectral reflectance of at least 85% for light diffused-reflected from said paper in a wavelength range of from 440 nm to 640 nm, and a spectral reflectance distribution in which the difference between the maximum and minimum values of the spectral reflectance in said wavelength range is 5% or less.

DESCRIPTION OF THE PREFERRED EMBODIMENTS

Figure 1:
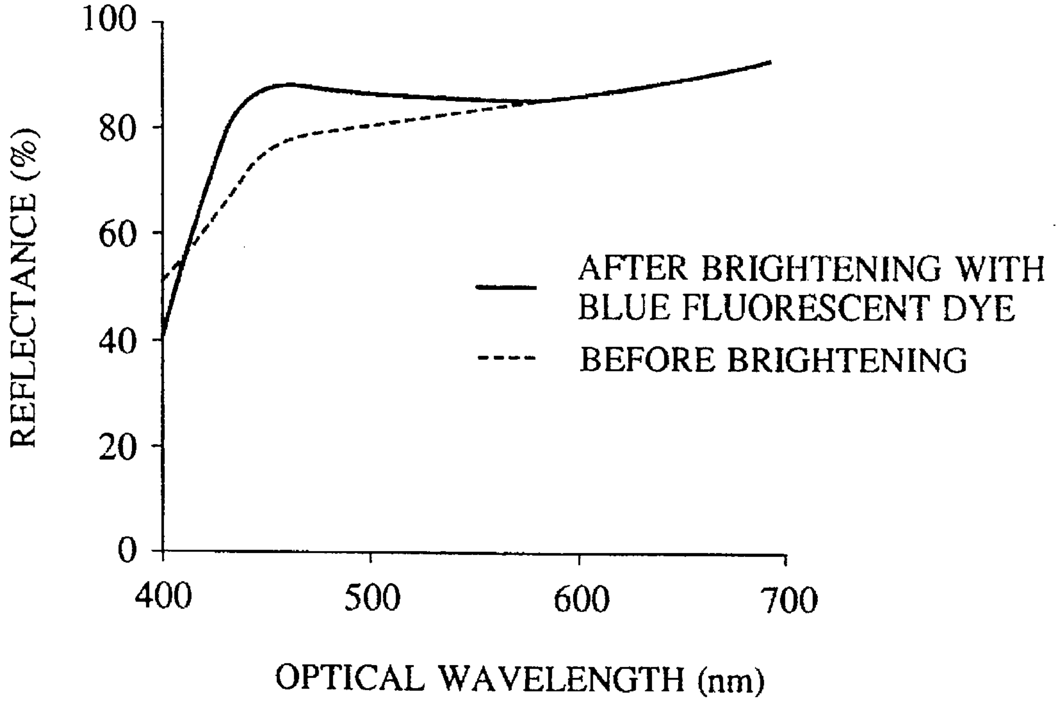
FIG. 1 is a graph showing the spectral reflectance distribution of an image forming paper according to Example 1 of the present invention.

As a result of intensive studies, the present inventors found that the color chroma of a color toner image formed with color toners on an image forming paper can be increased, particularly with respect to green to red regions, and the color reproduction area of the color image can be enlarged by adding a blue fluorescent dye, which emits blue fluorescent radiation, under conditions where no or a little amount (0.0002 wt % or less) of blue dye was added as a means for brightening the image forming paper, thereby preventing decrease of the reflectance in green to red regions (wavelength range of from 500 nm to 700 nm), increasing the reflectance in the blue region (wavelength range of from 440 nm to 500 nm) and making the reflectance in blue to red regions almost even.

An image forming paper of the present invention has a spectral reflectance of at least 85% (85% to 100%), and preferably, at least 87% (87% to 100%), for light diffused-reflected from said paper in a wavelength range of from 440 nm to 640 nm, and has a spectral reflectance distribution in which the difference between the maximum and minimum values of the spectral reflectance of the light in the above wavelength range is 5% or less (0% to 5%), preferably, 4.5% or less (0% to 4.5%), and more preferably, 3% or less (0% to 3%).

If the spectral reflectance in the above wavelength range is less than 85% , since the amount of light reflected from the image forming paper is absolutely insufficient and the base of the paper is gray, color chroma of toner on the paper is liable to decrease significantly. Particularly, in the wavelength range of from 440 nm to 500 nm, even if the spectral reflectance is several percent lower than 85% , the base of the paper is gray.

If the difference between the maximum and minimum values of the spectral reflectance in the above wavelength range is more than 5%, since the light reflected from the paper is shifted from white and the paper reflects light tinged according to the difference of the reflectance, the color of toner on the paper varies.

In the present invention, an image forming paper having the above-mentioned spectral reflectance distribution can be obtained by selecting a treatment agent, that is, fluorescent dye or dye and controlling the additive amount of the treatment agent.

In order to increase reflectance in the blue region (wavelength range of from 440 nm to 500 nm), it is preferable to add a blue fluorescent dye for emitting fluorescent radiation having a wavelength near 450 nm (preferably, 410 nm to less than 500 nm). As the blue fluorescent dye, 4,4'-diaminostilbene-disulfonic acid derivative dyes, for example, Mikephor BI conc (from Mitsui Toatsu Chemicals, Inc.), Mikephor BN conc (from Mitsui Toatsu Chemicals, Inc.), Leucphor SHRN Lig (from Sandoz K. K.), and Kaycoll CPNL (from Nippon Soda Co., Ltd), are used. Above all, Mikephor BN conc is the most preferable dye.

A preferable additive amount of the blue fluorescent dye is 0.08 wt % to 0.4 wt % relative to the weight of the image forming paper, and more preferably, 0.1 wt % to 0.3 wt %.

If the additive amount of the blue fluorescent dye is less than 0.08 wt %, since the paper is strongly tinged with yellow, which is the original color of pulp, tinges of blue and green, that is, color chroma reproducibility, tend to decrease. If the additive amount exceeds 4 wt %, the paper is excessively tinged with blue, and color reproduction area on the green-red side tends to be reduced.

In the present invention, a preferable fluorescence intensity zf value is 2.5 to 10.0, and more preferably, 2.5 to 7.0.

If the zf value is less than 2.5, since light emission from the paper itself is reduced and lightness decreases, the color chroma of toner on the paper is liable to decrease. If the zf value is more than 10.0, the amount of light emitted from the paper itself increases and lightness of the paper also increases. However, the light reflected by the paper tends to be tinged by radiation of the fluorescent dye.

The fluorescence intensity zf value is obtained by measuring three color stimulus values X, Y and Z with a colorimeter using a xenon light source and measuring the stimulus value Z through a violet ray filter.

In the present invention, it is preferable to add a green-red fluorescent dye emitting fluorescent radiation having a wavelength near 520 nm (preferably, 500 nm to 600 nm) besides the blue fluorescent dye.

As the green-red fluorescent dye, specifically, Kayaphor BK liguid (from Nippon Kayaku Co., Ltd.), Mikephor BS conc (from Mitsui Toatsu Chemicals Inc.), Mikephor BA conc (from Mitsui Toatsu Chemicals Inc.) and Kaycoll BRAL (Nippon Soda Co., Ltd.) are used. Above all, Kaycoll BRAL is the most preferable.

A preferable total additive amount of the green-red fluorescent dye and the blue fluorescent dye is 0.08 wt % to 0.4 wt % relative to the weight of the image forming paper, and more preferably, 0.1 wt % to 0.3 wt %. It is preferable that the additive amount of the green-red fluorescent dye be 1.2 to 10 times that of the blue fluorescent dye, and preferably, 2 to 10 times.

If the additive amount of the green-red fluorescent dye is less than 0.08 wt %, the paper is magenta and the color reproduction area of green is reduced. If the additive amount is more than 4 wt %, tinges from green to red are increased, and color reproduction area of blue is reduced.

If the additive amount of the green-red fluorescent dye is less than 1.2 times that of the blue fluorescent dye, the paper is still tinged with magenta. If it is more than 10 times, the paper is strongly tinged with yellow.

As described above, since fluorescent dye, such as the blue fluorescent dye and the green-red fluorescent dye, is more resistant to heat deterioration than non-fluorescent dye, paper brightened with such fluorescent dye hardly changes its color even if subjected to high heat. Therefore, as mentioned below, it is possible to fix a toner image by higher heat for a longer fixing time, thereby widening the latitude in setting fixing conditions.

Figure 8:
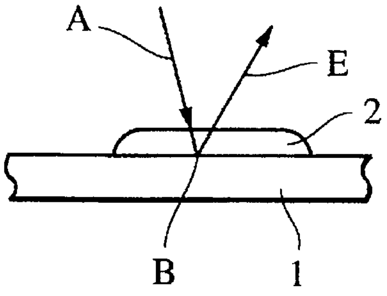
FIG. 8 is a view explaining color development of a color image.
Figure 9:
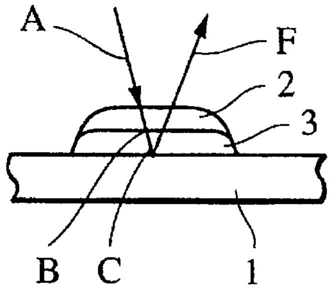
FIG. 9 is a view explaining color development of a color image.
Figure 10:
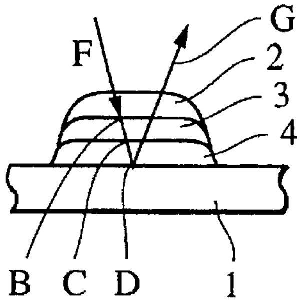
FIG. 10 is a view explaining color development of a color image.
Figure 11:
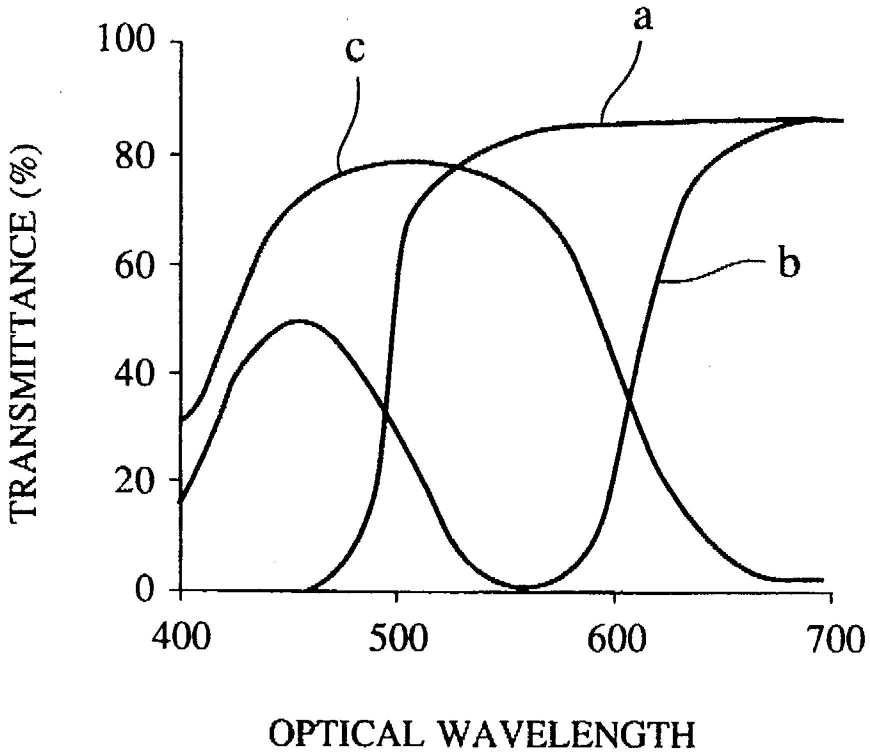
FIG. 11 is a graph showing the spectral transmittance of color toner.

Color development of an image by color toner on image forming paper will be explained with reference to FIGS. 8 to 11. Numerals 2, 3, and 4 respectively denote, for example, yellow, cyan and magenta toners. In FIGS. 11, *a*, *b* and *c* respectively denote spectral transmittance distributions of the yellow, magenta and cyan toners. Referring to FIG. 8, a blue component of white light A incident from an outside source is absorbed by the yellow toner 2, and a yellow component thereof remains at a point B. When the light A is reflected by an image forming paper 1 and passed again through the yellow toner 2, the yellow component is not absorbed, and is emitted outside as light E. The light E appears yellow. Similarly, in FIG. 9, since a blue component is absorbed at a point B, and a red component is absorbed by the cyan toner 3 at a point C, only a green component is transmitted, passing again through the toner layers and emitting outside as green light F. Similarly, in FIG. 10, since blue, red and green components are respectively absorbed at points B, C and D, all the light is absorbed by the image forming paper 1 and light G appears black.

Therefore, when an image is formed with color toner on the image forming paper 1, the intensity of light reflected and emitted outside is influenced by the reflectance of the image forming paper 1. In the image forming paper of the present invention, reflectance is not lowered in green to red regions, since the intensity of light emitted outside is higher than that of conventional image forming paper, colors appear brighter. This effect is noticeable, particularly when an image is formed with toners layered on the paper.

In the present invention, in order to absorb yellow of the paper itself, a little amount of blue dye may be added besides the blue fluorescent dye, or the blue fluorescent dye and the green-red fluorescent dye.

It is preferable that the additive amount of the blue dye be 0.0002 wt % or less, and preferably 0.0001 wt % or less, with respect to the weight of the image forming paper.

When the additive amount of the blue dye is more than 0.0002 wt %, absorption of yellow is promoted, and the paper becomes gray. Therefore, a desired lightness of more than 85% is difficult to obtain.

The image forming paper of the present invention is manufactured by mixing the loading material, the sizing material and starch in common use, and the blue fluorescent dye used in the present invention into LBKP (broadleaf kraft pulp) bleached by oxygen bleaching, and making paper by a Fourdrinier multi-plunger paper machine. The paper may be coated with a mixture of oxidized starch, salt and a little amount of fluorescent dye in a size press process as needed.

Furthermore, a green-red fluorescent dye may be applied onto paper containing a blue fluorescent dye in the above-mentioned size press process as needed, or all such materials may be mixed in raw materials of paper and put in the paper machine.

In the present invention, the spectral reflectance distribution of the image forming paper is measured in the following manner.

The spectral reflectance distribution was measured by using the High-speed spectrophotometer, CA-35, from Murakami Color Research Laboratory Co. Ten 50- by 50-mm samples were piled and set at a sample window in order to prevent light leakage from the meter, and color measurement was carried out by using a diffraction grating within a wavelength range of from 390 nm to 730 nm. The light source of light applied to the samples is a halogen lamp and the light includes ultraviolet rays capable of obtaining sufficient fluorescence.

An image forming process using the image forming paper of the present invention will now be described in detail.

Figure 12:
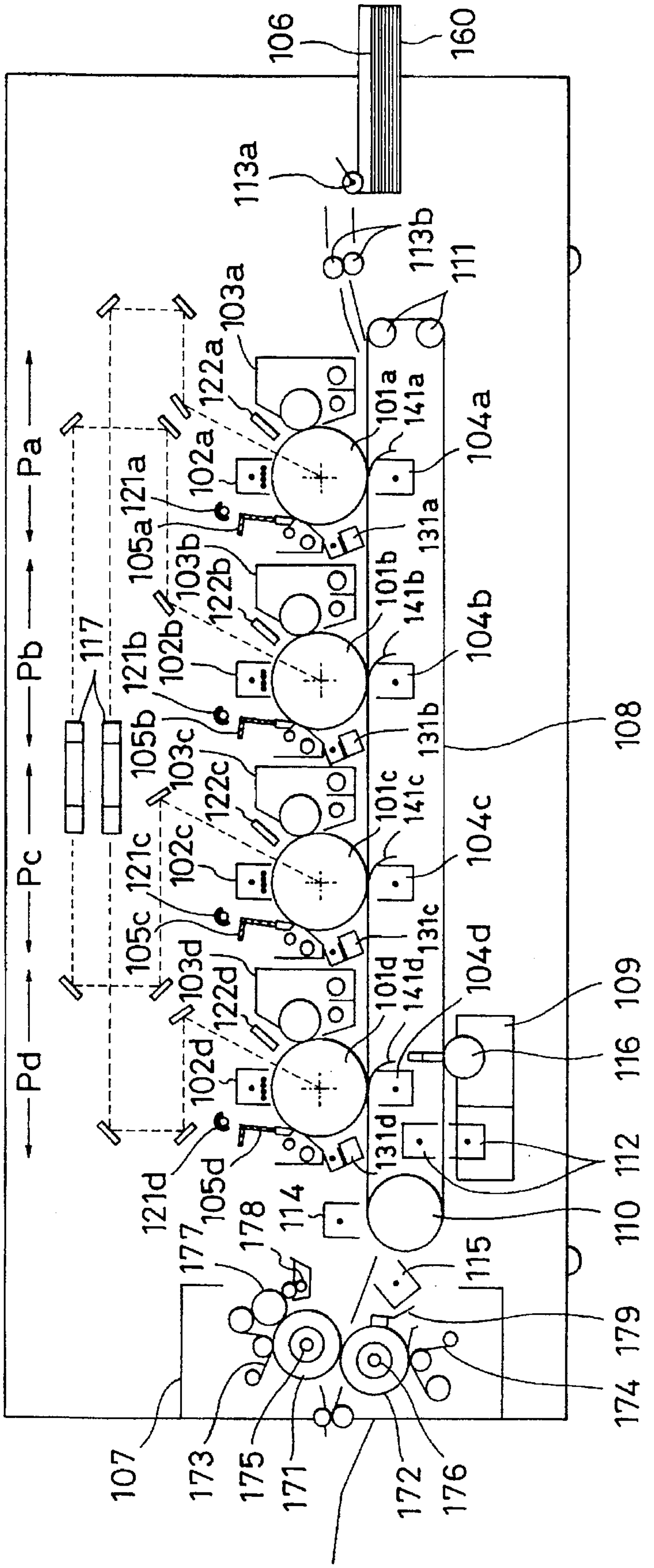
FIG. 12 is a view explaining an image forming process using the image forming paper according to the present invention.

FIG. 12 shows the general structure of a full-color copying machine, which uses the image forming paper of the present invention as transfer paper, as an example of an image forming apparatus using the image forming process of the present invention.

Inside the copying machine, four image forming sections Pa, Pb, Pc and Pd are positioned in order from the upstream side (the right side of FIG. 12) to respectively form images of different four colors (cyan, magenta, yellow and black) through charging, exposure, development and transfer processes. Electrophotographic photoconductive drums (referred to as merely "photoconductive drums" hereinafter) 101*a*, 101*b*, 101*c* and 101*d* are respectively mounted in the image forming sections Pa, Pb, Pc and Pd as an exclusive image bearing member. Toner images formed on these photoconductive drums are transferred onto an image forming paper 106 which is held and transported by a paper bearing member 108 to be moved near the image forming sections, and fixed on the image forming paper 106 in a fixing section 107 by heat and pressure, and the image forming paper 106 is ejected outside the machine.

A latent image forming section will be described. Around and above the photoconductive drums 101*a* 101*b*, 101*c* and 101*d* which are movably mounted, there are provided exposure lamps 121*a*, 121*b*, 121*c* and 121*d*, chargers 102*a*, 102*b*, 102*c* and 102*d*, an unillustrated light source, polygon mirrors 117 for scanning light emitted from the light source, and potential sensors 122*a*, 122*b*, 122*c* and 122*d*. First, the photoconductive drums 101*a*, 101*b*, 101*c* and 101*d* are uniformly charged respectively by the chargers 102*a*, 102*b*, 102*c* and 102*d*. Laser light emitted from the unillustrated light source is scanned by the rotatable polygon mirrors 117, the scanned light deflected by reflecting mirrors is applied onto the photoconductive drums 101*a*, 101*b*, 101*c* and 101*d* through fθ lenses (not shown), thereby forming a latent image on each of the photoconductive drums according to image signals.

Developing devices 103*a*, 103*b*, 103*c* and 103*d* are respectively filled with cyan, magenta, yellow and black developers (toners) by a predetermined amount through unillustrated suppliers. Visible images (toner images) corresponding to the latent images formed by the above scanning light are formed with the developer on the respective photoconductive drums 101*a*, 101*b*, 101*c* and 101*d*.

The image forming paper 106, to which the toner images are transferred, is supplied from a paper cassette 160, and transported to each of the photoconductive drums 101*a*, 101*b*, 101*c* and 101*d* held by the belt-shaped paper bearing member 108 through a feed roller 113*a* and registration rollers 113*b*. The paper bearing member 108 is a film made of dielectric resin, such as a polyethylene terephthalate resin film sheet (PET sheet), a polyvinylidene fluoride resin film sheet, or a polyurethane resin film sheet, and is shaped in an endless belt formed by overlaying and coupling both ends thereof, or a seamless belt. (When the belt has a seam, a means for detecting the position of the seam may be provided to prevent a toner image from being transferred onto the seam.) The paper bearing member 108 is stretched between upstream rollers 111 and a downstream roller 110, and, when the paper bearing member 108 starts to move, the image forming paper 106 is transported from the registration rollers 113*b* onto the paper bearing member 108. At this time, an image start signal is turned ON, and image formation is performed on the most upstream photoconductive drum 101*a* with a certain timing. Then, under the photoconductive drum 101*a*, the toner image on the photoconductive drum 101*a* is transferred onto the image forming paper 106 by uniform pressure from a transfer pressing member 141*a* and an electric field applied from a transfer charger 104*a*. The image forming paper 106 is held on the paper bearing member 108 by electrostatic absorptive force, and then transported to the next image forming section Pb, and a magenta toner image is transferred onto the image forming paper 106 from the photoconductive drum 102*b* in the same manner as above. After that, yellow and black toner images are similarly transferred by the photoconductive drums 101*c* and 101*d*. The image forming paper 106, to which toner images of four colors are transferred, is discharged by separating chargers 114 and 115, separated from the paper bearing member 108 by attenuation of electrostatic absorptive force, and transported to the fixing section 107.

The fixing section 107 comprises a fixing roller 171, a pressure roller 172, heat-resistant cleaning members 173 and 174 for respectively cleaning the rollers 171 and 172, heaters 175 and 176 for respectively heating the rollers 171 and 172, an oil applying roller 177 for applying lubricant oil, such as dimethyl silicone, onto the fixing roller 171, an oil reservoir 178 for supplying the oil, and a thermistor 179 for controlling the fixing temperature. The toner images on the image forming paper 106 transported from the paper bearing member 108 to the fixing section 107 are fixed on the surface of the image forming paper 106 by heat and pressure. After the toner images are fixed, the image forming paper 106 is ejected outside the machine.

The photoconductive drums 101*a*, 101*b*, 101*c* and 101*d* after transfer, that is, each having no toner image, are cleared of developer left on the surface thereof by cleaning devices 105*a*, 105*b*, 105*c* and 105*d*, and prepare for the succeeding operation for forming latent images. The developer remaining on the paper bearing member 108 is discharged by a belt discharger 112 to remove electrostatic absorptive force therefrom, and scraped off into a reclaim chamber 109 by a rotatable fur brush 116. A blade, nonwoven cloth or a combination thereof may be used to remove the developer.

Figure 13:
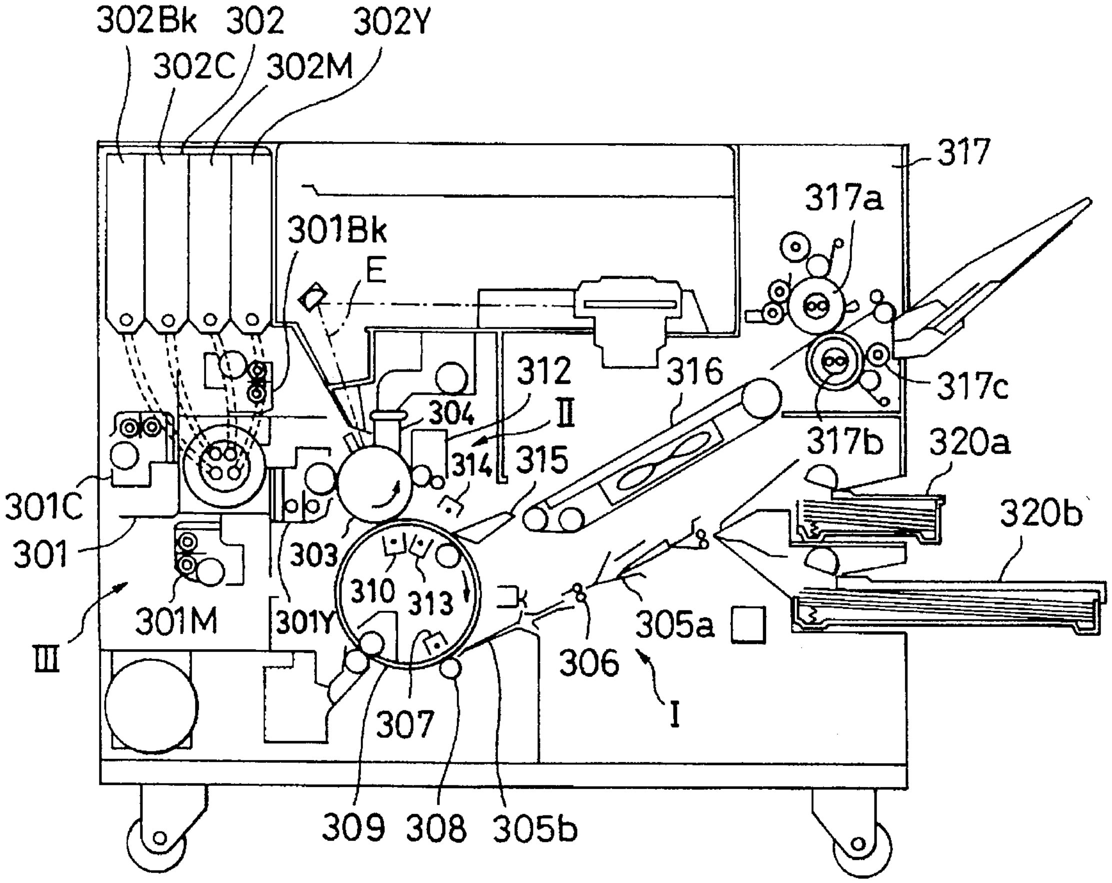
FIG. 13 is a view explaining an image forming process using the image forming paper according to the present invention.

In the image forming process of the present invention, a copying machine shown in FIG. 13 may be substituted for the above-mentioned copying machine shown in FIG. 12.

The copying machine shown in FIG. 13 comprises a paper transport system I mounted on one side (the right side of FIG. 13) to nearly the center of the main body of the machine, a latent image forming section II mounted near a transfer drum 309, which is a component of the paper transport system I, nearly in the near center of the main body of the machine, a developing means, that is, a rotary developing device III disposed near the latent image forming section II, and a developer supply means, that is, a developer supply device 302 disposed near the rotary developing device III.

The paper transport system I comprises paper supply trays 320*a* and 320*b* detachable from openings formed on one side of the main body of the machine (the right side of FIG. 13), paper feed guides 305*a* and 305*b* provided with paper feed rollers 306, the transfer drum 309 disposed near the paper feed guide 305*b* to be rotatable in the direction of the arrow in FIG. 13, a transport belt 316 disposed near a separating claw 315, an eject tray disposed near the ending edge of the transport belt 316 in the transport direction, elongating outside the main body of the machine, and detachable from the main body of the machine, and a fixing device 317 disposed near the eject tray. The transfer drum 309 is provided with a contact roller 308, a gripper 307, a charger 314 for paper separation, and the separating claw 315 located in order from the upstream side to the downstream side in the rotating direction near the outer peripheral surface thereof, and with a transfer charger 310 and a charger 313 for paper separation on the inner peripheral side thereof.

The latent image forming section II comprises an image bearing member, that is, a photoconductive drum 303 which is located in contact with the outer peripheral surface of the transfer drum 309 on the outer peripheral surface thereof and is rotatable in the direction of the arrow in FIG. 13, a cleaning means 312 and a primary charger 304 disposed in order from the upstream side to the downstream side in the rotating direction of the photoconductive drum 303 near the outer peripheral surface of the photoconductive drum 303, an image exposure means and an image exposure reflecting means, such as a laser beam scanner, for forming an electrostatic latent image on the outer peripheral surface of the photoconductive drum 303.

The rotary developing system III comprises a rotary member 301, and a magenta developing device 301M, a cyan developing device 301C, a yellow developing device 301Y and a black developing device 301Bk, which are mounted on the rotary member 301 to visualize (develop) electrostatic latent images formed on the outer peripheral surface of the photoconductive drum 303 in positions opposed to the outer peripheral surface of the photoconductive drum 303.

Furthermore, the developer supply device 302 comprises a yellow hopper 302Y, a magenta hopper 302M, a cyan hopper 302C and a black hopper 302Bk which are disposed next to one another to hold developers of respective colors supplied from outside.

Therefore, the image forming process of the present invention forms color images with color toners on image forming paper by the image forming apparatus shown in FIG. 12 or 13.

Since the image forming paper of the present invention has a spectral reflectance of at least 85% for light diffused-reflected from the paper in a wavelength range of from 440 nm to 640 nm, and a spectral reflectance distribution in which the difference between the maximum and minimum values of the spectral reflectance in the above wavelength range is 5% or less, sufficient amount of light reflected from the paper can be obtained, color chroma of a color having blue and green-red wavelength components is high, and the color reproduction area of a color image formed on the image forming paper can be enlarged.

EXAMPLES

Although the present invention will now be described in detail with reference to the preferred Examples, these Examples do not limit the present invention.

Example 1

Figure 3:
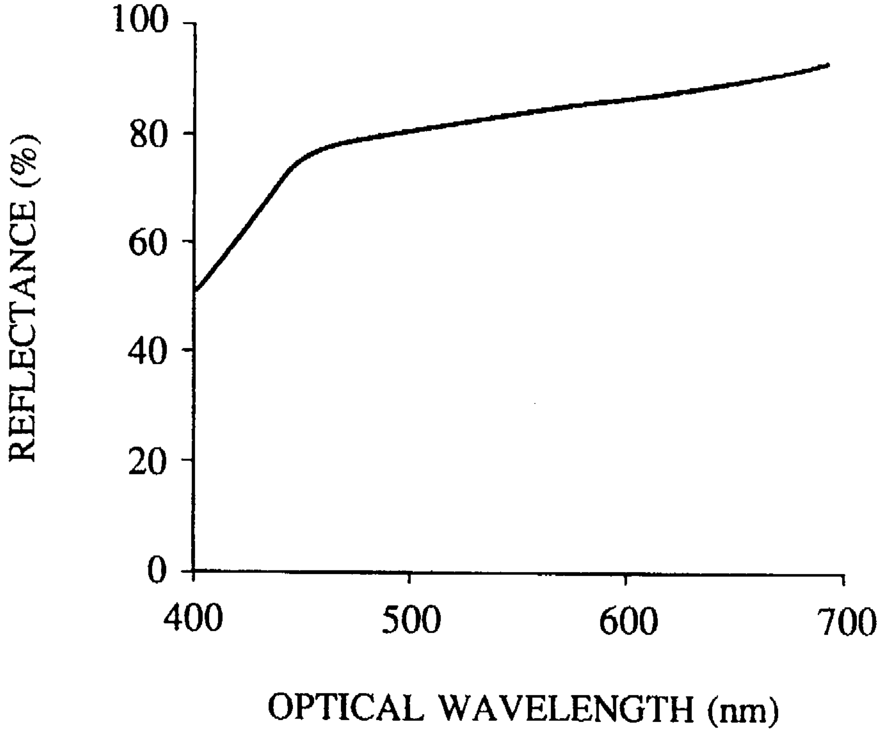
FIG. 3 is a graph showing the spectral reflectance distribution of an image forming paper according to Comparative Example 1.

10% of loading material, 3.2% of starch and 0.2% of additive sizing material were mixed in LBKP [Laubholz (broad-leaved tree) Bleached Kraft Pulp] bleached by oxygen bleaching and papermaking was performed by a Fourdrinier paper machine, thereby making a base. FIG. 3 shows the spectral reflectance distribution of the base. To add to the above papermaking process of the base, a CI No. Floryecent 86 fluorescent dye, Mike phor BN conc (from Mitsui Toatsu Chemicals Inc.)(emitting blue radiation having an average fluorescent radiation wavelength of 450 nm), as a blue fluorescent dye was applied by 0.1 wt % to the base together with starch as bonding material, and brightening was performed in the size press process, thereby producing an image forming paper having a fluorescent intensity zf value of 2.6.

The spectral reflectance distribution of the obtained image forming paper after brightening with the glue fluorescent dye is shown in FIG. 1. The spectral reflectance did not decrease in green to red regions after brightening as shown in FIG. 1. In the wavelength range of from 440 nm to 640 nm, the minimum value of the spectral reflectance of the image forming paper was 85% , and the difference between the maximum value and the minimum value of the spectral reflectance in the above wavelength range was 4%.

When a full-color image was formed on the obtained image forming paper by using the image forming apparatus shown in FIG. 13, chroma of each color of the obtained image was good, and in particular, reproducibility of blue was high.

Comparative Example 1

The base used in Example 1 was used as image forming paper as it is without being brightened. The fluorescence intensity zf value of the image forming paper was 0. Furthermore, as shown in FIG. 3, the minimum value of the spectral reflectance was 72% in the wavelength range of from 440 nm to 640 nm and the difference between the maximum and minimum values of the spectral reflectance in the above wavelength range was 17%.

When a full-color image was formed on this image forming paper by using the image forming apparatus shown in FIG. 13 in the same manner as in Example 1, since the image forming paper is more yellowish than that of Example 1, color chroma of blue was decreased and shifted to green.

Comparative Example 2

An image forming paper having a fluorescence intensity zf value of 0.2 was produced in the same manner as in Example 1 except that brightening was performed while a phthalocyanine dye as blue dye was mixed by 0.0004 wt % in the base used in Example 1 instead of the blue fluorescent dye.

Figure 5:
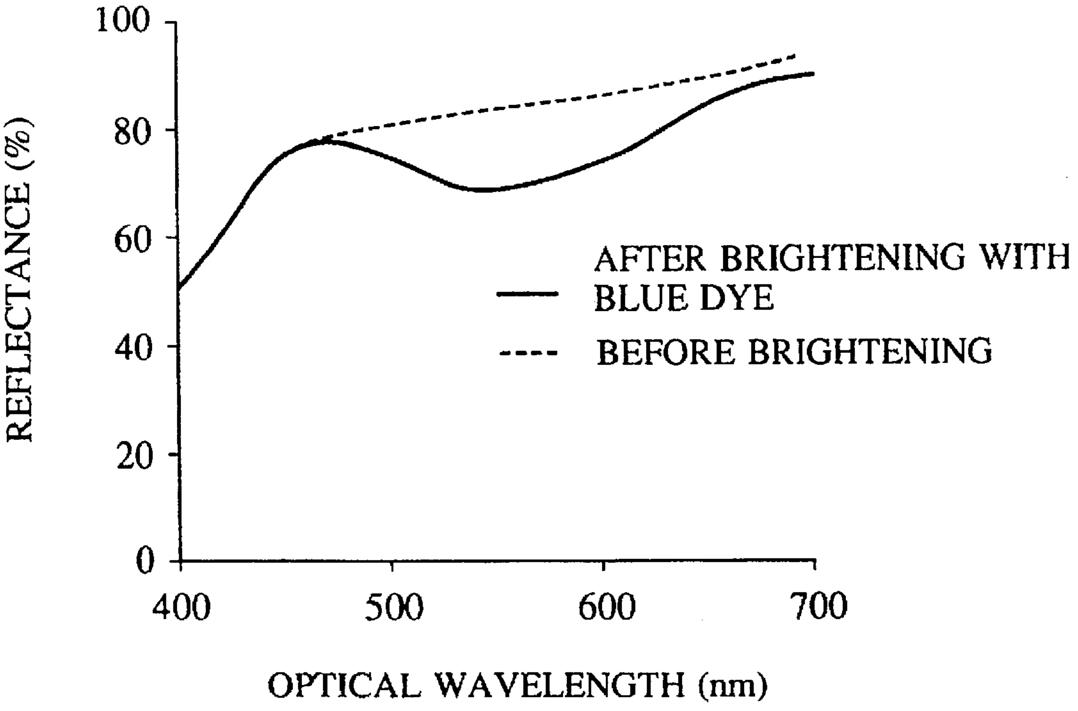
FIG. 5 is a graph showing the spectral reflectance distribution of an image forming paper according to Comparative Example 2.

FIG. 5 shows the spectral reflectance distribution of the obtained image forming paper after brightening with the blue dye. In the image forming paper, as shown in FIG. 5, the reflectance decreased in green to red regions (wavelength range of from 500 nm to 700 nm) except for a blue region after brightening.

As shown in FIG. 5, the minimum value of the spectral reflectance of the image forming paper was 69% in the wavelength range of from 440 nm to 640 nm, and the difference between the maximum and minimum values of the spectral reflectance in the above wavelength range was 9%.

When a full-color image was formed on the obtained image forming paper by using the image forming apparatus shown in FIG. 13 in the same manner as in Example 1, color chroma of green particularly decreased and green appeared muddy.

Comparative Example 3

An image forming paper having a fluorescence intensity zf value of 14.0 was produced in the same manner as in Example 1 except that the amount of the blue fluorescent dye used to brighten the base in Example 1 was changed to 0.6 wt % with respect to the base.

Figure 6:
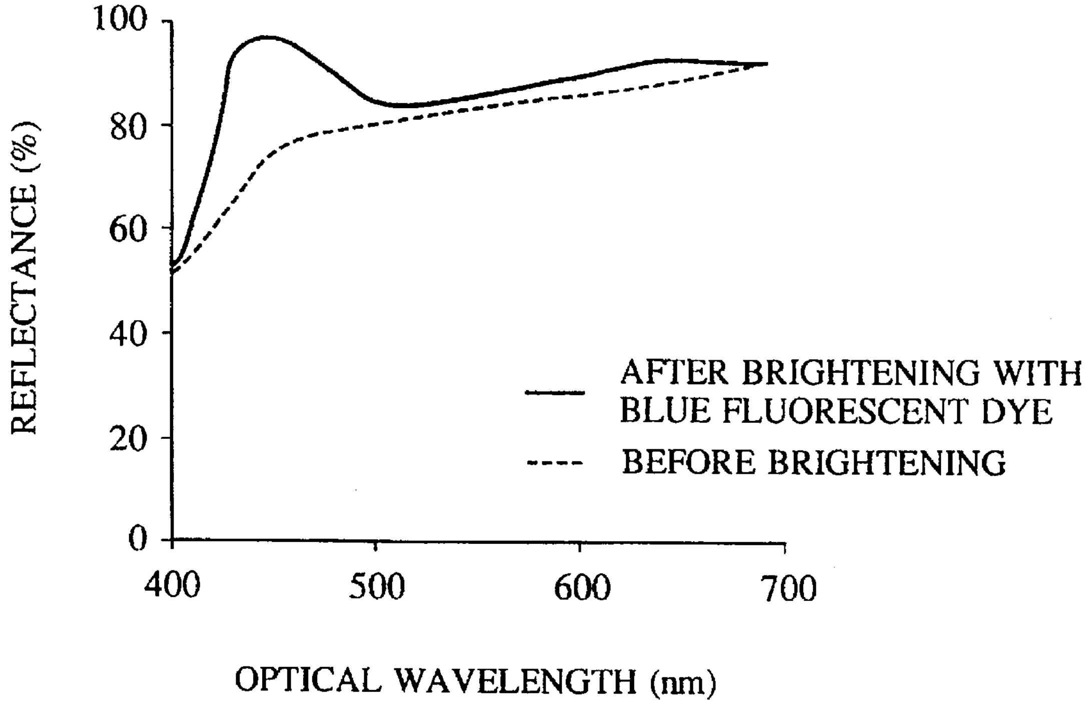
FIG. 6 is a graph showing the spectral reflectance distribution of an image forming paper according to Comparative Example 3.

FIG. 6 shows the spectral reflectance distribution of the obtained image forming paper after blue dye brightening.

As shown in FIG. 6, the minimum value of the spectral reflectance of the image forming paper was 85% in the wavelength range of from 440 nm to 640 nm, and the difference between the maximum and minimum values of the spectral reflectance in the above wavelength range was 13%.

When a full-color image was formed on the obtained image forming paper by using the image forming apparatus shown in FIG. 13 in the same manner as in Example 1, since blue light emission is too intense, the whole image was tinged with blue and appeared unnatural.

Comparative Example 4

An image forming paper having a fluorescence intensity zf value of 1.2 was produced in the same manner as in Example 1 except that the base used in Example 1 was brightened with a mixture of 0.0006 wt % of blue dye and 0.04 wt % of blue fluorescent dye instead of the blue fluorescent dye.

Figure 4:
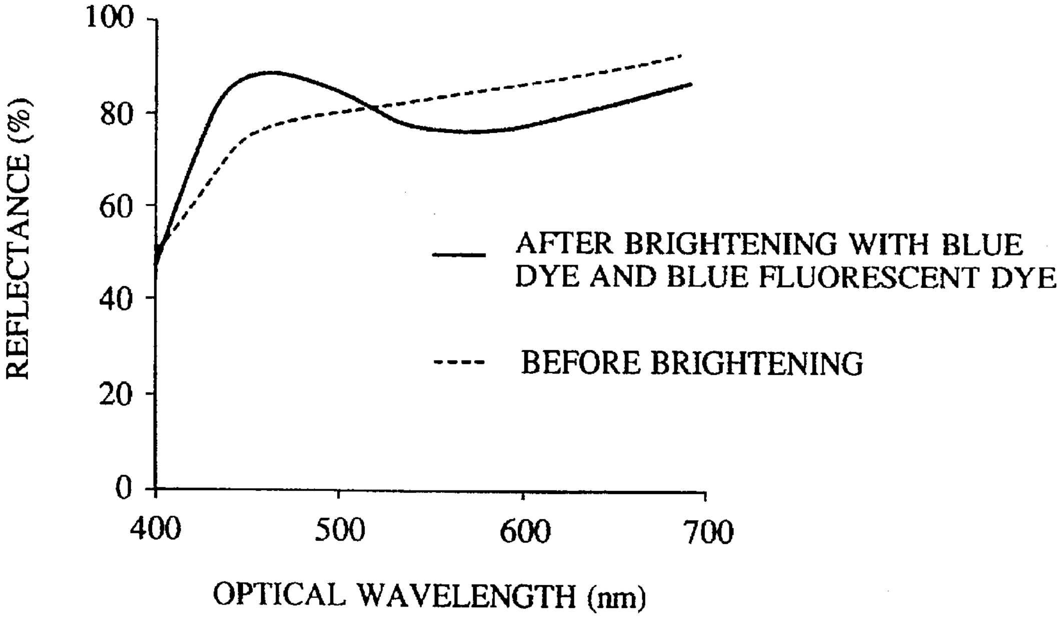
FIG. 4 is a graph showing the spectral reflectance distribution of a conventional image forming paper brightened with blue dye and blue fluorescent dye.

FIG. 4 shows the spectral reflectance distribution of the obtained image forming paper after brightening with the blue dye and the blue fluorescent dye. In the image forming paper, as shown in FIG. 4, the reflectance increased in a blue region, while it decreased in green to red regions (wavelength range of from 500 nm to 700 nm).

As shown in FIG. 4, the minimum value of the spectral reflectance of the image forming paper was 78% in the wavelength range of from 440 nm to 640 nm, and the difference between the maximum and minimum values of the spectral reflectance in the above wavelength range was 12%.

Example 2

An image forming paper having a zf value of intensity zf value of 3.5 was produced in the same manner as in Example 1 except that Mikephor BN conc (from Mitsui Toatsu Chemicals Inc.) (emitting blue radiation having an average fluorescent radiation wavelength of 450 nm) as blue fluorescent dye was added by 0.15 wt % to the base used in Example 1, and then, Mikephor BA conc (from Mitsui Toatsu Chemicals Inc.) (having radiation characteristics in which the fluorescent radiation wavelength resonates from blue to green-red) was added by 0.15 wt % as a green-red fluorescent dye.

Figure 2:
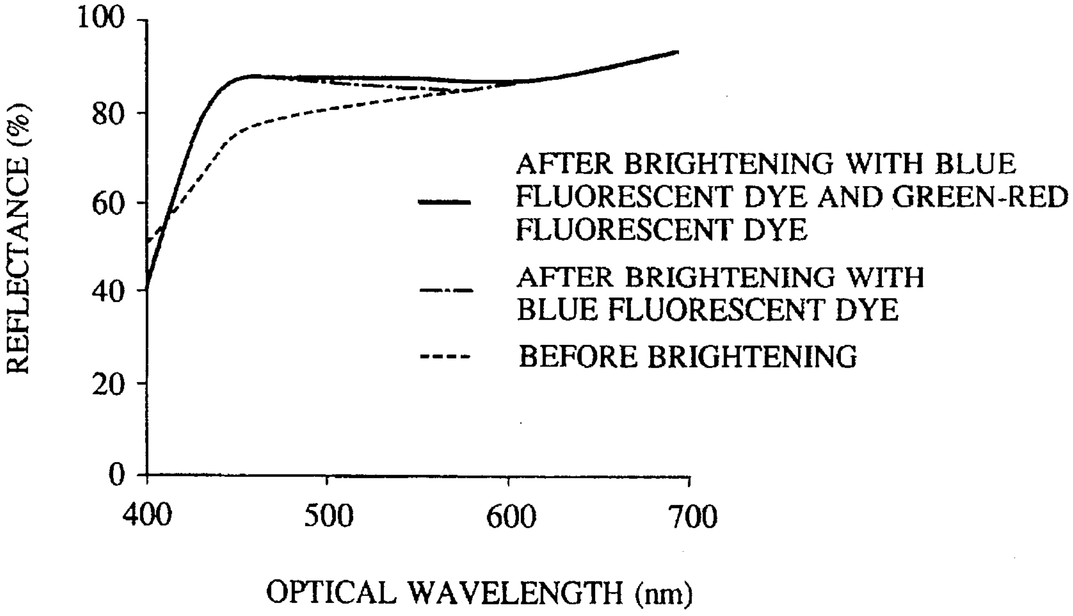
FIG. 2 is a graph showing the spectral reflectance distribution of an image forming paper according to Example 2.

FIG. 2 shows the spectral reflectance distribution of the obtained image forming paper after brightening with the blue fluorescent dye and the green-red fluorescent dye. As shown in FIG. 2, the reflectance was more higher than that of Example 1 in green to red regions (wavelength range of from 500 nm to 700 nm) except for a blue region after brightening, the difference of the reflectance between the blue region and the green-red region was small, and a flat spectral reflectance was obtained.

As shown in FIG. 2, the minimum value of the spectral reflectance distribution of the image forming paper was 88% in the wavelength range of from 440 nm to 640 nm, and the difference between the maximum and minimum values of the spectral reflectance in the above wavelength range was 1%.

When a full-color image was formed on the obtained image forming paper by using respectively the image forming apparatus shown in FIGS. 12 and 13 in the same manner as in Example 1, brightness of the formed toner image was higher than that of Comparative Example 1 as visually recognized, and a high-quality full-color image could be obtained.

Figure 7:
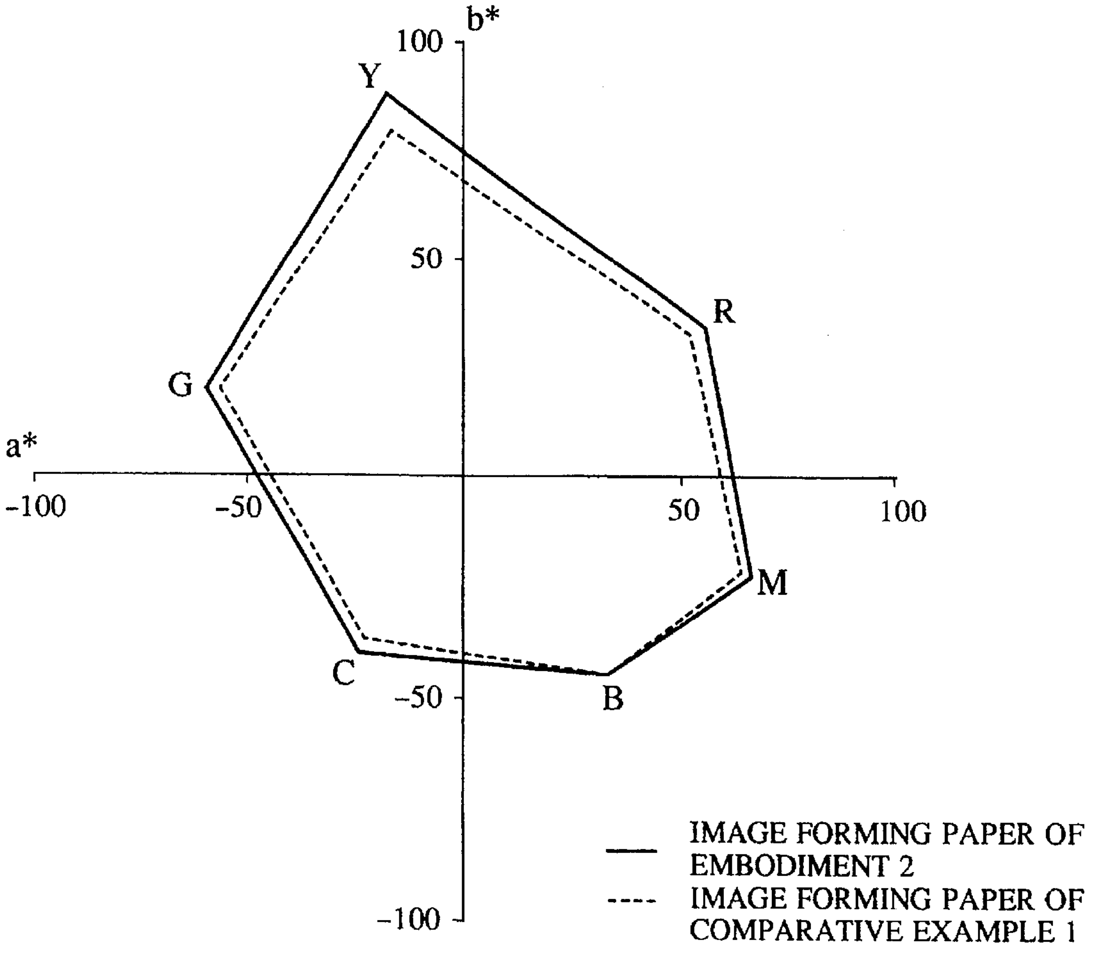
FIG. 7 is a view showing color reproduction areas of the image forming paper of Example 2 and the image forming paper of Comparative Example 1 in an L*a*b color space.

FIG. 7 shows color reproduction areas of the image forming paper of Example 2 and the image forming paper of Comparative Example 1 in an L*a*b* color space. As shown in FIG. 7, in the image forming paper of Example 2, color reproduction areas of a*b* components corresponding to green to red regions (positive and negative components of a* and a positive component of b*) are enlarged.

Example 3

An image forming paper having a fluorescence intensity zf value of 2.0 was produced in the same manner as in Example 2 except that the additive amounts of the blue fluorescent dye and the green-red fluorescent dye used for brightening in Example 2 were respectively changed to 0.038 wt % and 0.042 wt %.

The minimum value of the spectral reflectance of the image forming paper was 85% in the wavelength range of from 440 nm to 640 nm, and the difference between the maximum and minimum values of the spectral reflectance in the above wavelength range was 4.8%.

When a full-color image was formed on the obtained image forming paper by using respectively the image forming apparatus shown in FIGS. 12 and 13 in the same manner as in Example 1, color chroma of the obtained toner image slightly decreased owing to a little lack of lightness. However, the difference between the maximum and minimum values of the spectral reflectance was 4.8%, and there was no problem in image balance.

Example 4

An image forming paper having a fluorescence intensity zf value of 6.5 was produced in the same manner as in Example 2 except that the additive amounts of the blue fluorescent dye and the green-red fluorescent dye used for brightening in Example 2 were respectively changed to 0.03 wt % and 0.37 wt %.

The minimum value of the spectral reflectance of the image forming paper was 90% in the wavelength range of from 440 nm to 640 nm, and the difference between the maximum and minimum values of the spectral reflectance in the above wavelength range was 5%.

When a full-color image was formed on the obtained image forming paper by using respectively the image forming apparatus shown in FIGS. 12 and 13 in the same manner as in Example 2, although the amount of spectral reflected light of green was larger than that of Example 2, there was no problem in whiteness of the paper. Reproducibility of blue was a little lower than other colors. However, since the amount of reflected light is high as a whole, the decrease of color chroma presents no problem as far as human eyes sense.

While the present invention has been described with respect to what is presently considered to be the preferred embodiments, it is to be understood that the invention is not limited to the disclosed embodiments. To the contrary, the invention is intended to cover various modifications and equivalent formulations included within the spirit and scope of the appended claims. The scope of the following claims is to be accorded the broadest interpretation so as to encompass all such modifications and equivalent formulations and functions.

What is claimed is:

1. A paper for forming images comprising at least pulp; said paper having a spectral reflectance of at least 85% for light diffused-reflected from said paper in a wavelength range of from 440 nm to 640 nm, and a spectral reflectance distribution in which the difference between the maximum and minimum values of the spectral reflectance in said wavelength range is 5% or less.

2. A paper according to claim 1, wherein said paper has a spectral reflectance of at least 87% for light diffused-reflected from said paper in said wavelength range.

3. A paper according to claim 1, wherein said paper has a spectral reflectance distribution in which the difference between the maximum and minimum values of the spectral reflectance in said wavelength range is 3% or less.

4. A paper according to claim 1, wherein a blue fluorescent dye for emitting fluorescent radiation near a wavelength of 450 nm is added to said paper.

5. A paper according to claim 4, wherein said blue fluorescent dye emits fluorescent radiation in a wavelength range of from 410 nm to less than 500 nm.

6. A paper according to claim 4, wherein said blue fluorescent dye is added in an amount of from 0.08 wt % to 0.4 wt % based on the weight of said paper.

7. A paper according to claim 4, wherein said blue fluorescent dye is added in an amount of from 0.1 wt % to 0.3 wt % based on the weight of said paper.

8. A paper according to claim 1, wherein a blue fluorescent dye for emitting fluorescent radiation near a wavelength of 450 nm and a green-red fluorescent dye for emitting fluorescent radiation near a wavelength of 520 nm are added to said paper, and the total additive amount of said blue fluorescent dye and said green-red fluorescent dye is in an amount of from 0.08 wt % to 0.4 wt % based on the weight of said paper.

9. A paper according to claim 8, wherein said blue fluorescent dye emits fluorescent radiation in a wavelength range of from 410 nm to less than 500 nm and said green-red fluorescent dye emits fluorescent radiation in a wavelength range of from 500 nm to 600 nm.

10. A paper according to claim 8, wherein the total additive amount of said blue fluorescent dye and said green-red fluorescent dye is in an amount of from 0.1 wt % to 0.3 wt % base on the weight of said paper.

11. A paper according to claim 8, wherein the additive amount of said green-red fluorescent dye is 1.2 to 10 times that of said blue fluorescent dye.

12. A paper according to claim 8, wherein the additive amount of said green-red fluorescent dye is 2 to 10 times that of said blue fluorescent dye.

13. A paper according to claim 1, wherein said paper has a fluorescence intensity zf value of 2.5 to 10.

14. A paper according to claim 1, wherein said paper has a fluorescence intensity zf value of 2.5 to 7.

* * * * *

UNITED STATES PATENT AND TRADEMARK OFFICE

CERTIFICATE OF CORRECTION

PATENT NO. : 5,656,379

DATED : August 12, 1997

INVENTOR(S) : J. KOIDE et al.

It is certified that error appears in the above-identified patent and that said Letters Patent is hereby corrected as shown below:

COLUMN 8:

Line 39, change "Mike phor" to --Mikephor--.

Signed and Sealed this

Third Day of November, 1998

Attest:

BRUCE LEHMAN

Attesting Officer

Commissioner of Patents and Trademarks